(12) United States Patent
Kashyap (10) Patent No.: US 6,944,786 B2
(45) Date of Patent: Sep. 13, 2005

(54) NETWORK NODE FAILOVER USING MULTICAST ADDRESS OR PORT

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 09/917,464

(22) Filed: Jul. 27, 2001

(65) Prior Publication Data

US 2003/0023896 A1 Jan. 30, 2003

(51) Int. Cl.[7] .............................................. G06F 11/00
(52) U.S. Cl. ....................................................... 714/4
(58) Field of Search ............................................ 714/4

(56) References Cited

U.S. PATENT DOCUMENTS

| | | | |
|---|---|---|---|
| 6,078,957 A | * | 6/2000 | Adelman et al. ........... 709/224 |
| 6,108,300 A | | 8/2000 | Coile et al. |
| 6,185,695 B1 | | 2/2001 | Murphy et al. |
| 6,581,166 B1 | * | 6/2003 | Hirst et al. ...................... 714/4 |
| 6,760,861 B2 | * | 7/2004 | Fukuhara et al. ............... 714/4 |
| 6,782,422 B1 | * | 8/2004 | Bahl et al. ................... 709/224 |
| 2001/0047407 A1 | * | 11/2001 | Moore et al. ................ 709/223 |
| 2002/0156612 A1 | * | 10/2002 | Schulter et al. ............... 703/23 |
| 2002/0198927 A1 | * | 12/2002 | Craddock et al. ........... 709/200 |
| 2003/0018813 A1 | * | 1/2003 | Antes et al. ................. 709/245 |
| 2003/0043805 A1 | * | 3/2003 | Graham et al. .............. 370/392 |

OTHER PUBLICATIONS

W. Richard Stevens, TCP/IP Illustrated, vol. 1 The Protocols, 1994, Addison Wesley, pp. 175–178.*

Entry for the term "multicast," Computer Desktop Encyclopedia, The Computer Language Company, Inc., version 17.4, 4th quarter 2004, copyright 1981–2004.

Linda Legregni, Maximizing web site availability, IBM high-volume web site team. ibm.com/websphere/developer/zones/hvws, Feb. 25, 2002, version 1.0.

* cited by examiner

Primary Examiner—Robert Beausoliel
Assistant Examiner—Michael Maskulinski
(74) Attorney, Agent, or Firm—Bryan Butler (57) ABSTRACT

The failover of nodes within networks, using a multicast address or a multicast port, is disclosed. A first node of a network joins a multicast group having a multicast address, which is assigned to the first node. Communication to the first node is achieved via communication to the multicast address, and/or through a multicast port on a switch of the network mapping to a port on the first node. When the first node fails, one of two actions occurs. First, a second node of the network may join the multicast group, such that the multicast address is assigned to the second node, and the second node handles communication to the multicast address. Second, the multicast port on the switch may be remapped to a port on the second node, so that communication to the multicast address is directed to the port on the second node.

19 Claims, 10 Drawing Sheets

NETWORK NODE FAILOVER USING MULTICAST ADDRESS OR PORT

BACKGROUND OF THE INVENTION

1. Technical Field

This invention relates generally to networks, such as Infiniband networks, and more particularly to failover of nodes within such networks.

2. Description of the Prior Art

Input/output (I/O) networks, such as system buses, can be used for the processor of a computer to communicate with peripherals such as network adapters. However, constraints in the architectures of common I/O networks, such as the Peripheral Component Interface (PCI) bus, limit the overall performance of computers. Therefore, new types of I/O networks have been proposed.

One new type of I/O network is known and referred to as the InfiniBand network. The InfiniBand network replaces the PCI or other bus currently found in computers with a packet-switched network, complete with one or more routers. A host channel adapter (HCA) couples the processor to a subnet, whereas target channel adapters (TCAs) couple the peripherals to the subnet. The subnet includes at least one switch, and links that connect the HCA and the TCAs to the switches. For example, a simple InfiniBand network may have one switch, to which the HCA and the TCAs connect through links. Topologies that are more complex are also possible and contemplated.

Each end node of an Infiniband network contains one or more channel adapters (CAs) and each CA contains one or more ports. Each port has a local identifier (LID) assigned by a local subnet manager (SM). Within the subnet, LIDs are unique. Switches use the LIDs to route packets within the subnet. Each packet of data contains a source LID (SLID) that identifies the port that injected the packet into the subnet and a destination LID (DLID) that identifies the port where the Infiniband fabric, or network, is to deliver the packet.

The Infiniband network methodology provides for multiple virtual ports within a physical port by defining a LID mask count (LMC). The LMC specifies the number of least significant bits of the LID that a physical port masks, or ignores, when validating that a packet DLID matches its assigned LID. Switches do not ignore these bits, however. The SM can therefore program different paths through the Infiniband fabric based on the least significant bits. The port thus appears to be $2^{LMC}$ ports for the purpose of routing across the fabric.

For critical applications needing round-the-clock availability without failure, failover of individual applications and thus communication endpoints, or end nodes, is usually required. Communication endpoints in the context of an Infiniband network are associated with CA ports. The applications use the endpoints to communicate over the Infiniband network, such as with other applications and so on. Transparent failover of an endpoint can mean that another endpoint takes over the responsibilities of the failed endpoint, in a manner that does not disrupt communications within network itself.

Transparent failover of endpoints and other nodes within an Infiniband network, however, is difficult to achieve because of how the endpoints are addressed. Failover requires that the LID be reassigned to a new port that is taking over for the failed port. However, the new port usually already has a LID assigned to it. Therefore, the only way an additional LID can be assigned is to expand the LMC range on the port, and then to ensure that the new LID falls within that range.

Expanding LMC ranges on ports is difficult in practice, however, and requires sometimes significant overhead to ensure that takeover ports can have the LIDs of failed ports assigned to them. LID failover is therefore viewed as a problem and a barrier to the successful rollout of Infiniband networks where transparent failover is required. For these reasons, as well as other reasons, there is a need for the present invention.

SUMMARY OF THE INVENTION

The invention relates to failover of nodes within networks using a multicast address or a multicast port. In a method of the invention, a first node of a network joins a multicast group having a multicast address. Either the multicast address is assigned to the first node, or a multicast port on a switch of the network is mapped to a port on the first node. Communication to the multicast address in the first case is directed to the first node through the network, and in the second case is directed to the port on the first node from the multicast port on the switch. When the first node fails, one of two actions occurs. First, a second node of the network may join the multicast group, such that the multicast address is assigned to the second node, and the second node handles communication to the multicast address. Second, the multicast port on the switch may be remapped to a port on the second node, so that communication to the multicast address is directed to the port on the second node.

A system of the invention includes a first node, a second node, a switch, and a management component of a subnet. The first node has a port, and in a first mode is initially assigned a multicast address of a multicast group, such that initially the first node handles communication to the multicast address. The second node also has a port. The switch has a multicast port initially mapped to the port on the first node in a second mode. Upon failure of the first node, the management component either assigns the multicast address to the second node in the first mode, or remaps the multicast port on the switch to the port on the second node in the second mode. The second node thus subsequently handles communication to the multicast address.

An article of manufacture of the invention includes a computer-readable medium and means in the medium. The means is for performing one of two actions. First, the means may assign a multicast address of a multicast group that was initially assigned to a first node of a network to a second node of the network, upon failure of the first node. Second, the means may remap a multicast port on a switch of the network that was initially assigned to a port on the first node to a port on the second node, upon failure of the first node.

Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
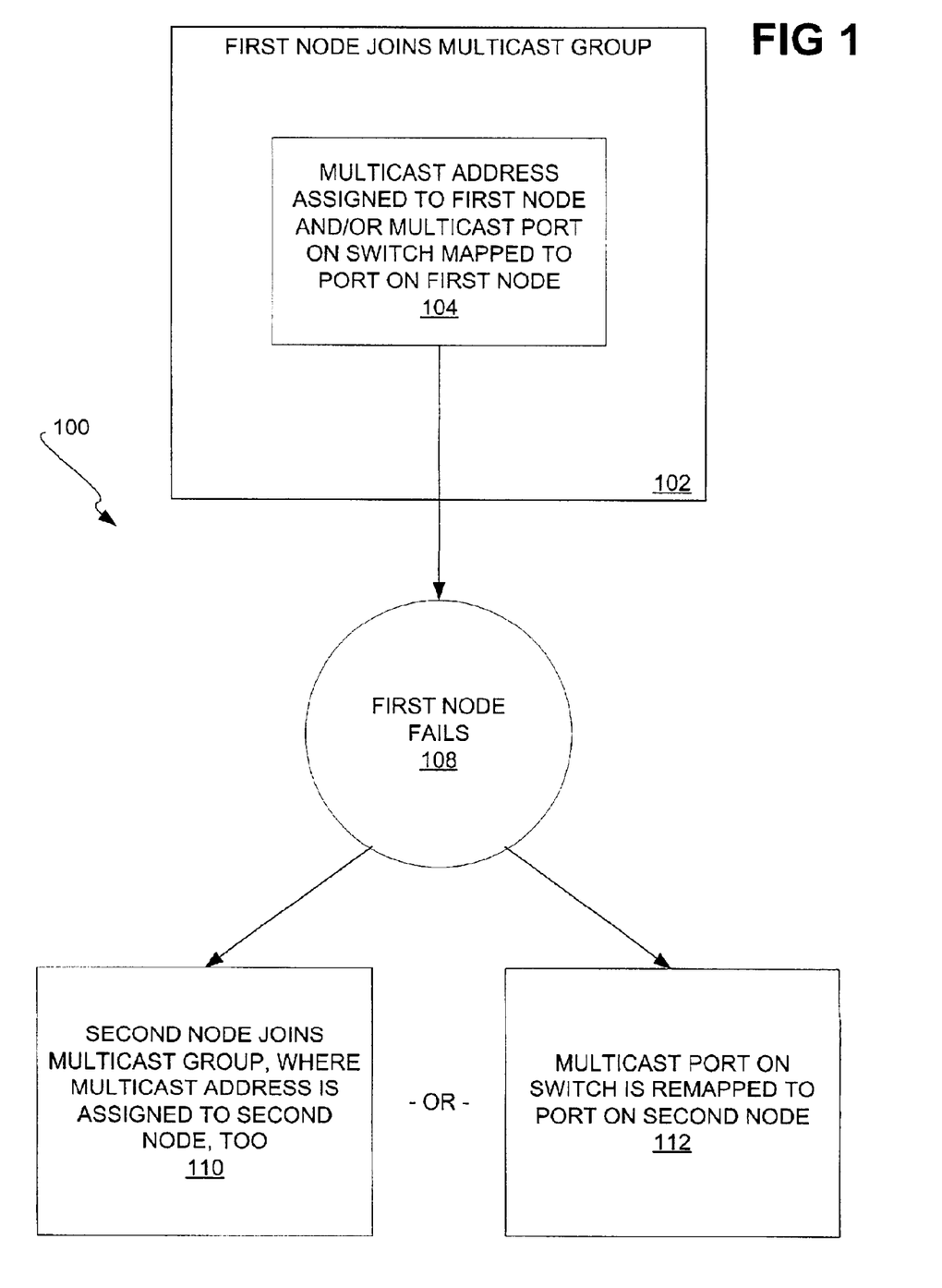
FIG. 1 is a flowchart of a method according to a preferred embodiment of the invention, and is suggested for printing on the first page of the issued patent.

FIG. 1 shows a method 100 according to a preferred embodiment of the invention. A first node of a network initially joins a multicast group (102). The multicast group has a multicast address. At least one of two actions is performed (104), depending on whether a switch of the network supports multicasting. If the switch supports multicasting, which is considered a first mode, then the multicast address is assigned to the first node. Communication to the multicast address may then be automatically directed to the first node, where the network may have been previously manually or automatically set up to achieve such communication. If the switch does not support multicasting, which is considered a second mode, then a multicast port on a switch of the network is mapped to, or associated with, a port on the first node. Communication to the multicast address may then be directed to the port on the first node from the multicast port on the switch, where the switch does not support multicasting. The network is preferably an Infiniband network. The first and the second nodes may be hosts on such a network having channel adapters (CAs) and ports.

The first node then fails (108), such that preferably transparent failover of the first node by a second node of the network occurs. This can involve the performance of one of two actions. First, the second node may join the multicast group, such that the multicast address is assigned to the second node, too (110). Communication to the multicast address is thus directed to the second node as well as to the first, failed node, such that the second node takes over handling of such communication from the first node. Second, the multicast port on the switch may be remapped to a port on the second node (112). Communication to the multicast address is thus directed to the port on the second node, such that the second node takes over handling of such communication.

A management component, such as a subnet manager (SM) of an Infiniband subnet, may perform the assignment of the multicast address of the multicast group that was initially assigned to the first node to the second node. The management component may also perform the remapping of the multicast port on the switch that was initially mapped to the port on the first node to the port on the second node. Means in a computer-readable medium of an article of manufacture may perform this functionality, too. The means may be a recordable data storage medium, a modulated carrier signal, or another type of medium or signal.

Technical Background

Figure 2:
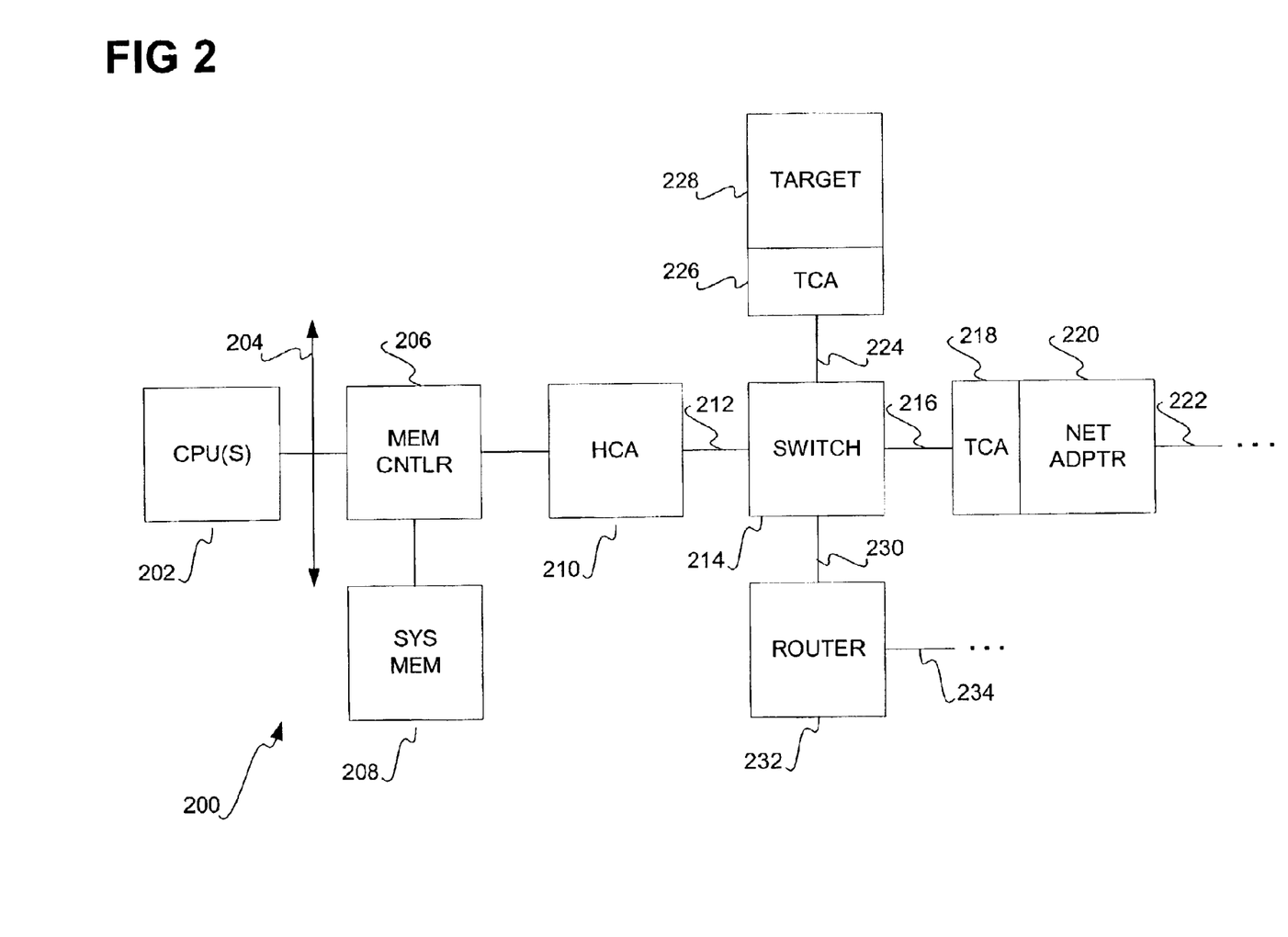
FIG. 2 is a diagram of an InfiniBand network in conjunction with which embodiments of the invention may be implemented.

FIG. 2 shows an example InfiniBand network architecture 200 in conjunction with which embodiments of the invention may be implemented. An InfiniBand network is one type of network. The invention can be implemented with other types of networks, too. Processor(s) 202 are coupled to a host interconnect 204, to which a memory controller 206 is also coupled. The memory controller 206 manages system memory 208. The memory controller 206 is also connected to a host channel adapter (HCA) 210. The HCA 210 allows the processor and memory sub-system, which encompasses the processor(s) 202, the host interconnect 204, the memory controller 206, and the system memory 208, to communicate over the InfiniBand network.

The InfiniBand network in FIG. 2 is particularly what is referred to as a subnet 236, where the subnet 236 encompasses InfiniBand links 212, 216, 224, and 230, and an InfiniBand switch 214. There may be more than one InfiniBand switch, but only the switch 214 is shown in FIG. 2. The links 212, 216, 224, and 230 enable the HCA and the target channel adapters (TCAs) 218 and 226 to communicate with one another, and also enables the InfiniBand network to communicate with other InfiniBand networks, through the router 232. Specifically, the link 212 connects the HCA 210 to the switch 214. The links 216 and 224 connect the TCAs 218 and 226, respectively, to the switch 224. The link 230 connects the router 232 to the switch 214.

The TCA 218 is the target channel adapter for a specific peripheral, in this case an Ethernet network adapter 220. A TCA may house multiple peripherals, such as multiple network adapters, SCSI adapters, and so on. The TCA 218 enables the network adapter 220 to send and receive data over the InfiniBand network. The adapter 220 itself allows for communication over a communication network, particularly an Ethernet network, as indicated by line 222. Other communication networks are also amenable to the invention. The TCA 226 is the target channel adapter for another peripheral, the target peripheral 228, which is not particularly specified in FIG. 2. The router 232 allows the InfiniBand network of FIG. 2 to connect with other InfiniBand networks, where the line 234 indicates this connection.

InfiniBand networks are packet switching input/output (I/O) networks. Thus, the processor(s) 202, through the interconnect 204 and the memory controller 206, sends and receives data packets through the HCA 210. Similarly, the target peripheral 228 and the network adapter 220 send and receive data packets through the TCAs 226 and 218, respectively. Data packets may also be sent and received over the router 232, which connects the switch 214 to other InfiniBand networks. The links 212, 216, 224, and 230 may have varying capacity, depending on the bandwidth needed for the particular HCA, TCA, and so on, that they connect to the switch 214.

InfiniBand networks provide for communication between TCAs and HCAs in a variety of different manners, which are briefly described here for summary purposes only. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

Furthermore, InfiniBand networks allow for a number of different transport services, including reliable and unreliable connections, reliable and unreliable datagrams, and raw packet support. In reliable connections and datagrams, acknowledgments and packet sequence numbers for guaranteed packet ordering are generated. Duplicate packets are rejected, and missing packets are detected. In unreliable connections and datagrams, acknowledgments are not generated, and packet ordering is not guaranteed. Duplicate packets may not be rejected, and missing packets may not be detected.

Figure 3:
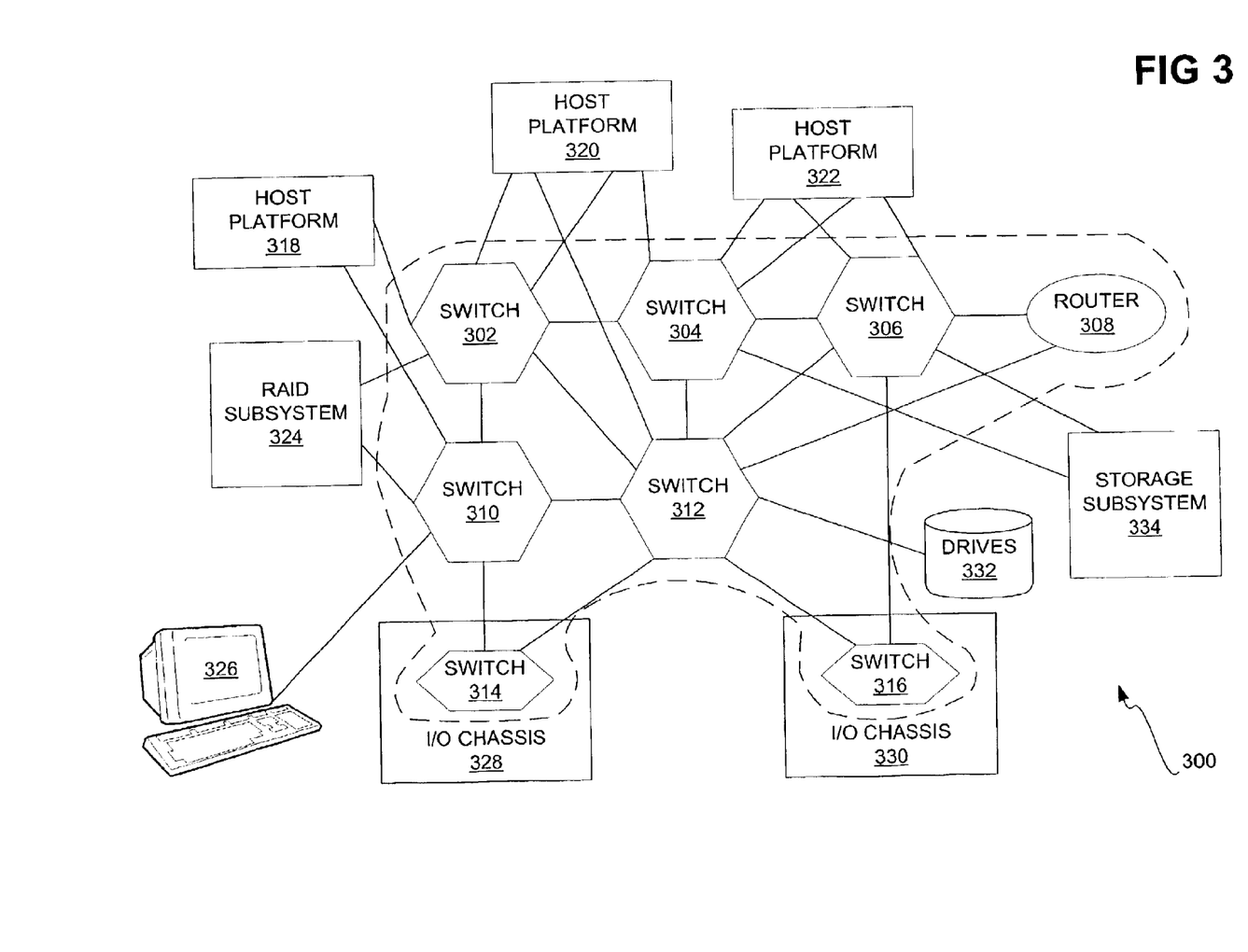
FIG. 3 is a diagram of an example Infiniband system area network (SAN) in conjunction with which embodiments of the invention may be implemented.

An Infiniband network can also be used to define a system area network (SAN) for connecting multiple independent processor platforms, or host processor nodes, I/O platforms, and I/O devices. FIG. 3 shows an example SAN 300 in conjunction with which embodiments of the invention may be implemented. The SAN 300 is a communication and management infrastructure supporting both I/O and inter-processor communications (IPC) for one or more computer systems. An Infiniband system can range from a small server to a massively parallel supercomputer installation. Furthermore, the Internet Protocol (IP)-friendly nature of Infiniband networks allows bridging to the Internet, an intranet, or connection to remote computer systems.

The SAN 300 has a switched communications fabric 301, or subnet, that allows many devices to concurrently communicate with high bandwidth and low latency in a protected, remotely managed environment. An end node can communicate over multiple Infiniband ports and can utilize multiple paths through the fabric 301. The multiplicity of ports and paths through the network 300 are exploited for both fault tolerance and increased data transfer bandwidth. Infiniband hardware off-loads much of the processor and I/O communications operation. This allows multiple concurrent communications without the traditional overhead associated with communicating protocols.

The fabric 301 specifically includes a number of switches 302, 304, 306, 310, and 312, and a router 308 that allows the fabric 301 to be linked with other Infiniband subnets, wide-area networks (WANs), local-area networks (LANs), and hosts, as indicated by the arrows 303. The fabric 301 allows for a number of hosts 318, 320, and 322 to communicate with each other, as well as with different subsystems, management consoles, drives, and I/O chasses. These different subsystems, management consoles, drives, and I/O chasses are indicated in FIG. 3 as the redundant array of information disks (RAID) subsystem 324, the management console 326, the I/O chasses 328 and 330, the drives 332, and the storage subsystem 334.

Figure 4:
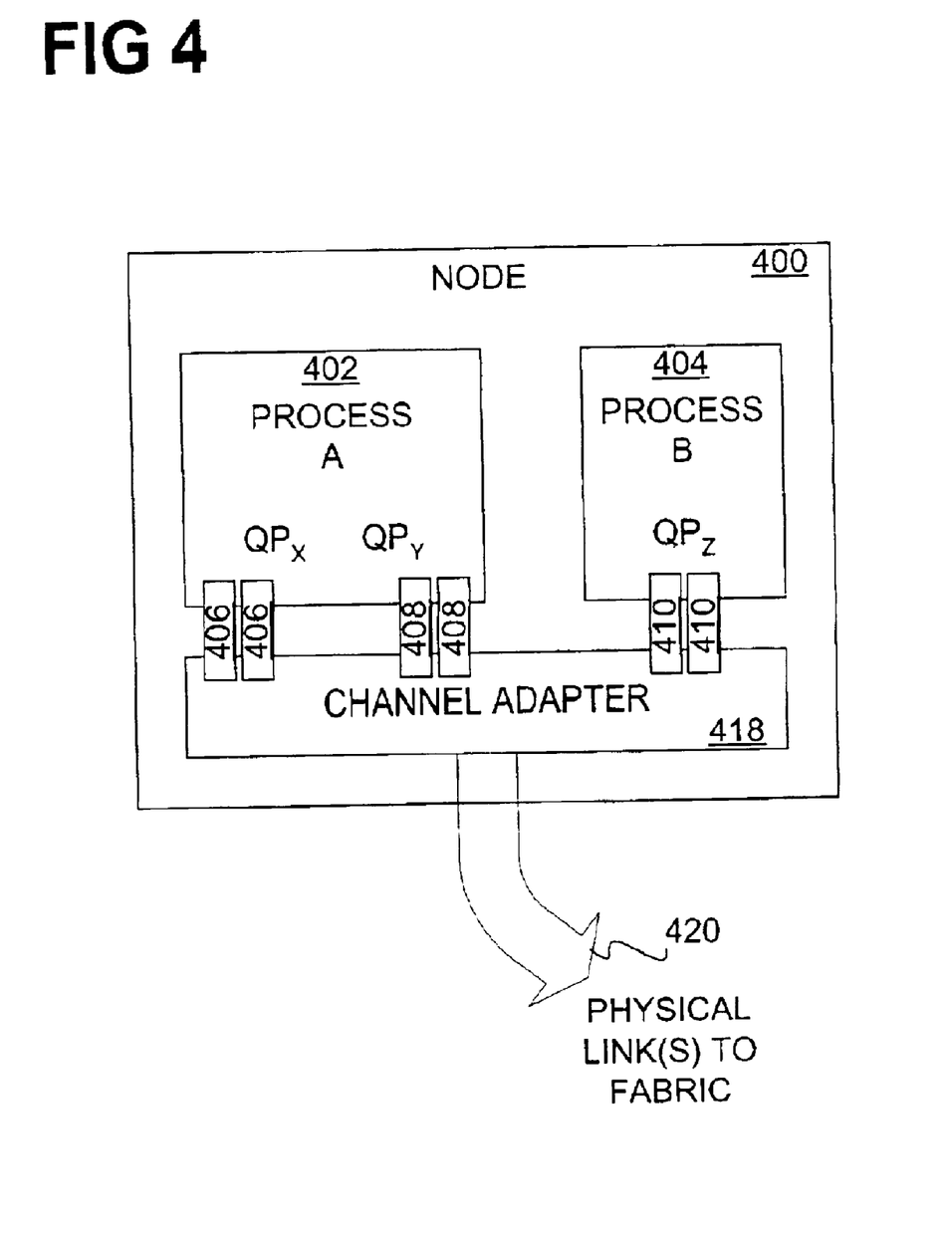
FIG. 4 is a diagram of a communication interface of an example end node of an Infiniband network.

FIG. 4 shows the communication interface of an example end node 400 of an Infiniband network. The end node may be one of the hosts 318, 320, and 322 of FIG. 3, for instance. The end node 400 has running thereon processes 402 and 404. Each process may have associated therewith one or more queue pairs (QPs), where each QP communicates with the channel adapter (CA) 418 of the node 400 to link to the Infiniband fabric, as indicated by the arrow 420. For example, the process 402 specifically has QPs 406 and 408, whereas the process 404 has a QP 410.

QPs are defined between an HCA and a TCA. Each end of a link has a queue of messages to be delivered to the other. A QP includes a send work queue and a receive work queue that are paired together. In general, the send work queue holds instructions that cause data to be transferred between the client's memory and another process's memory, and the receive work queue holds instructions about where to place data that is received from another process.

The QP represents the virtual communication interface with an Infiniband client process and provides a virtual communication port for the client. A CA may supply up to $2^{24}$ QPs and the operation on each QP is independent from the others. The client creates a virtual communication port by allocating a QP. The client initiates any communication establishment necessary to bind the QP with another QP and configures the QP context with certain information such as destination address, service level, negotiated operating limits, and so on.

Figure 5:
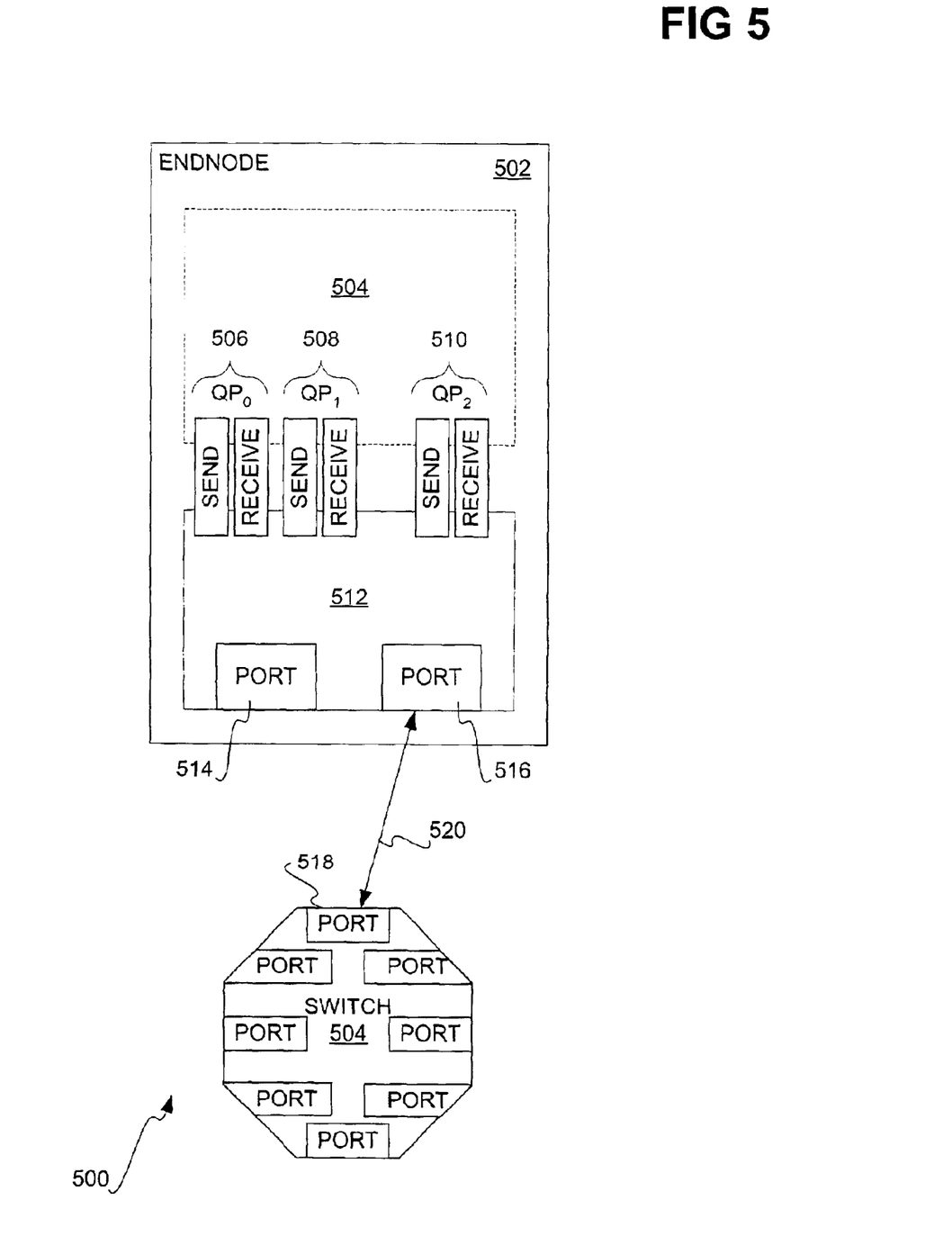
FIGS. 5 and 6 are diagrams of Infiniband networks showing how Infiniband addressing occurs.
Figure 6:
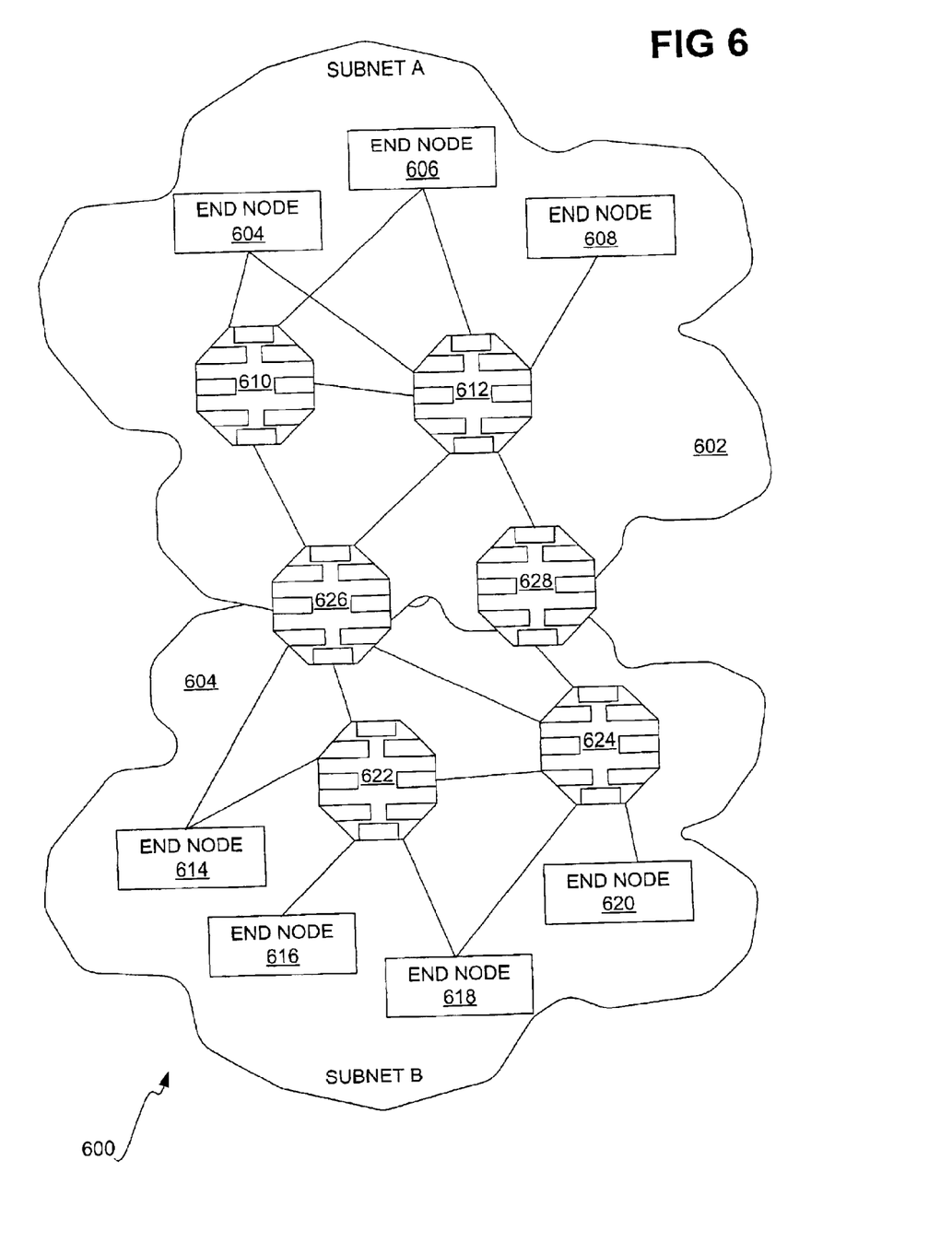

FIGS. 5 and 6 show how addressing occurs within an Infiniband network. In FIG. 5, a simple Infiniband network 500 is shown that includes one end node 502 and a switch 504. The end node 502 has running thereon processes 504 having associated QPs 506, 508, and 510. The end node 502 also includes one or more CAs, such as the CA 512. The CA 512 includes one or more communication ports, such as the ports 514 and 516. Each of the QPs 506, 508, and 510 has a queue pair number (QPN) assigned by the CA 512 that uniquely identifies the QP within the CA 512. Data packets other than raw datagrams contain the QPN of the destination work queue. When the CA 512 receives a packet, it uses the context of the destination QPN to process the packet appropriately.

A local subnet manager (SM) assigns each port a local identifier (LID). An SM is a management component attached to a subnet that is responsible for configuring and managing switches, routers, and CAs. An SM can be embedded with other devices, such as a CA or a switch. For instance, the SM may be embedded within the CA 512 of the end node 502. As another example, the SM may be embedded within the switch 504.

Within an Infiniband subnet, LIDs are unique. Switches, such as the switch 504, use the LID to route packets within the subnet. Each packet contains a source LID (SLID) that identifies the port that injected the packet into the subnet and a destination LID (DLID) that identifies the port where the fabric is to deliver the packet. Switches, such as the switch 504, also each have a number of ports. Each port on the switch 504 can be associated with a port on the end node 502. For instance, the port 518 of the switch 504 is associated with the port 516 of the end node 502, as indicated by the arrow 520. Data packets received by the switch 504 that are intended for the port 516 of the node 502 are thus sent to the port 516 from the port 518. More particularly, when the switch 504 receives a packet having a DLID, the switch only checks that the DLID is non-zero. Otherwise, the switch routes the packet according to tables programmed by the SM.

Besides DLIDs that each identify specific ports within an Infiniband subnet, multicast DLIDs, or multicast addresses, may also be specified. In general, a set of end nodes may join a multicast group, such that the SM assigns a port of each node with a multicast DLID of the multicast group. A data packet sent to the multicast DLID is sent to each node that has joined the multicast group. Each switch, such as the switch 504, has a default primary multicast port and a default non-primary multicast port that are associated with the multicast DLID of the multicast group. One port of each node that has joined the multicast group is associated with either the primary or the non-primary multicast port of the switch.

When a data packet that has a multicast DLID is received, the multicast DLID is examined, and the data packet is forwarded, based on the tables programmed by the SM. If the multicast DLID is not in the table, or the switch does not maintain tables, that it forwards the packets on the primary and non-primary default multicast ports. Data packets received by the switch 504 that specify the multicast DLID are thus sent from one of these multicast ports to the associated ports of the multicast group nodes. The switch 504 can be configured with routing information for the multicast traffic that specifies the ports where the packet should travel.

Furthermore, although any Infiniband node can transmit to any multicast group, data packets are not guaranteed to be received by the group members correctly if the switches, such as the switch 504, do not forward the packets correctly. Therefore, the switches should be set up so that multicast data packets are received by the group members. This can be accomplished by ensuring that multicast data packets are always funneled through a particular one or more switches that are preprogrammed, or proprietarily programmed, to ensure that multicast packets reach their proper destinations. Alternatively, the programming of the SM can be extended to ensure that the multicast group members receive the multicast packets properly. Other approaches may also be performed.

In FIG. 6, a more complex Infiniband network 600 is shown that has two subnets 602 and 604. The subnet 602 has end nodes 604, 606, and 608, which are variously connected to switches 610 and 612. Similarly, the subnet 604 has end nodes 614, 616, 618, and 20, which are variously connected to switches 622 and 624. The switches 610 and 612 of the subnet 602 are variously connected to the switches 622 and 624 of the subnet 604 through the routers 626 and 628, which enable inter-subnet communication. In this context, variously connected means that one or more ports of one entity are associated with one or more ports of another entity. For example, the node 604 may have two ports, one associated with the switch 610, and another associated with the switch 612.

Multicast Address Assignment to Second Node for First Node Failover

Figure 7:
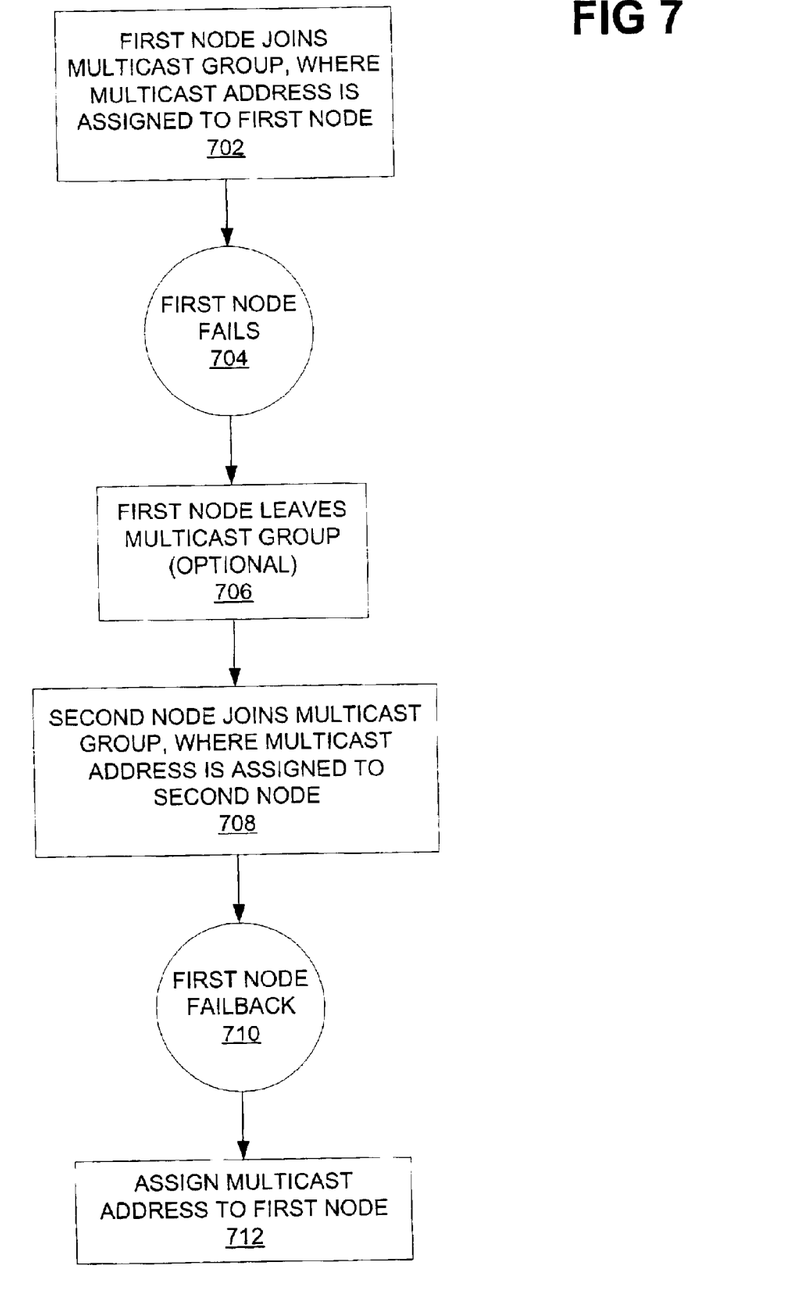
FIG. 7 is a flowchart of a method showing how an embodiment of the invention can achieve network node failover by assignment of the multicast address of a multicast group to another node.

Embodiments of the invention can achieve network node failover by assignment of the multicast address of a multicast group to another node. FIG. 7 shows a method 700 according to such an embodiment of the invention. A first node of an Infiniband network joins a multicast group, where the multicast address of the multicast group is assigned to the first node (702). The multicast address of the multicast group is preferably a multicast destination location identifier (DLID) in the range of 0×C000 hexadecimal to 0×FFFE hexadecimal. The subnet manager (SM) of the subnet of which the first node is a part assigns the multicast DLID to the first node, in response to a join request by the first node. The first node may be a channel adapter (CA) of a host on the subnet of the Infiniband network.

The first node then fails (704), which is typically detected by another node of the subnet. The first node may optionally leave the multicast group (706), by, for example, a second node of the subnet sending a leave request to the SM on behalf of the first node. This typically occurs in an Infiniband network in which DLIDs, and even multicast DLIDs, cannot be assigned to more than one node at a time, where the network is a type that does not permit multicasting, and thus does not permit the concurrent assignment of a DLID to multiple nodes. The second node joins the multicast group, and the multicast address is assigned to the second node (708). More specifically, the SM assigns the multicast DLID to the second node, in response to a join request by the second node. The second node may also be a CA of a host on the subnet of the Infiniband network. The host of the second node may be the same host as that of the first node. Communication intended for the multicast DLID is handled by the second node instead of the first node, such that the first node seamlessly fails over to the second node.

At some point, the first node may failback (710), coming back online. The multicast address of the multicast group is then assigned again to the first node (712), so that the first node can again handle communication intended for the multicast DLID. The second node of the subnet may have to initially leave the multicast group before the first node can rejoin the multicast group. The second node may thus send a leave request to the SM before the first node sends a join request to the SM so that the SM assigns the multicast DLID to the first node. Failback may also include the first node taking a state dump from the second node, where the second node freezes all connections until the failback has been completed. The second node may additionally not leave the multicast group until existing connections to the second node have expired.

Figure 8:
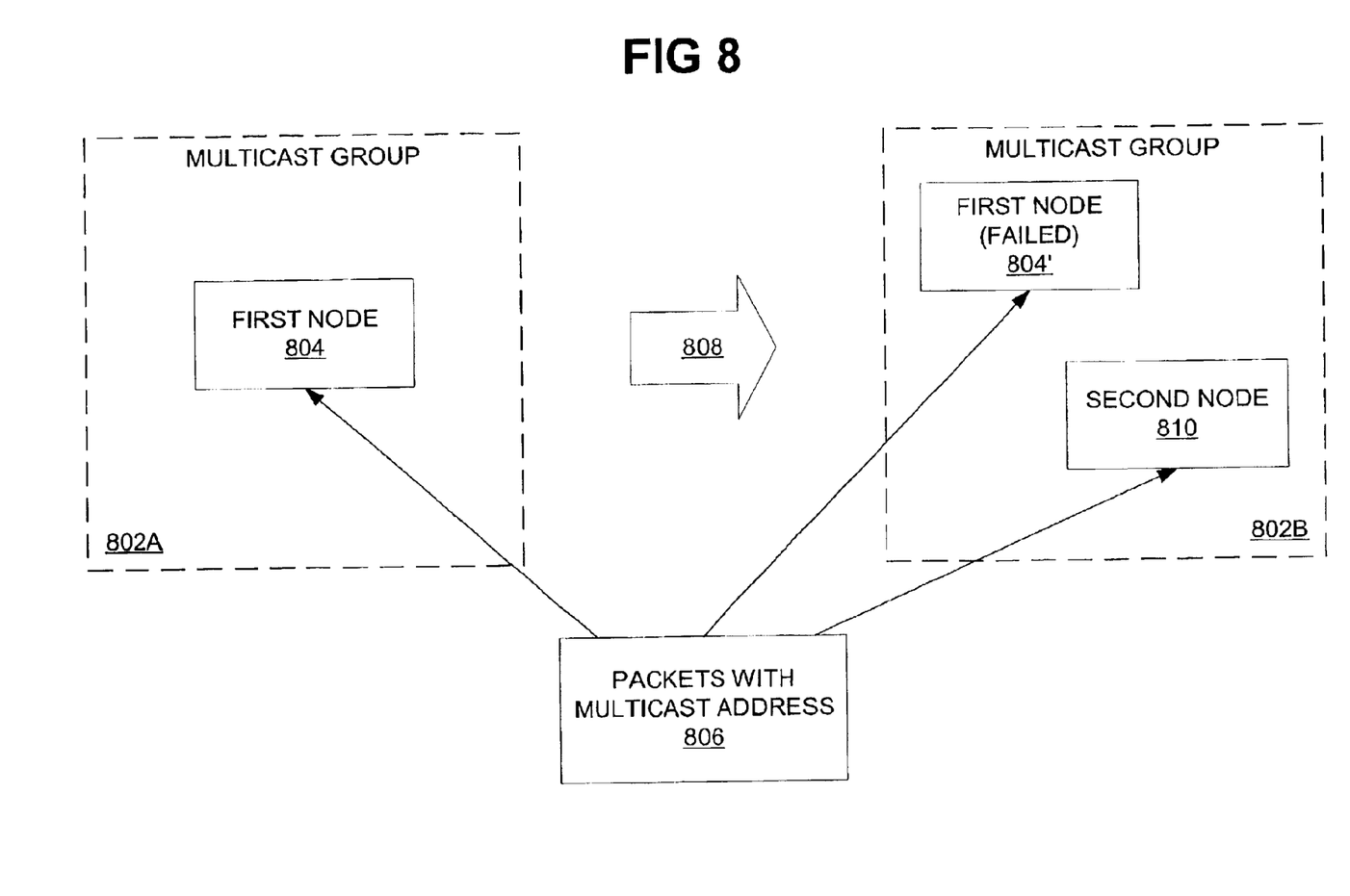
FIG. 8 is a diagram showing diagrammatically the performance of the embodiment of FIG. 7.

FIG. 8 shows the failover of the first node to the second node diagrammatically. The multicast group is denoted as the multicast group 802A to signify the pre-failure state of the first node 804. Packets 806 having the multicast DLID are therefore sent to the first node 804. The multicast group is denoted as the multicast group 802B to signify the post-failure state of the first node 804, such that the group 802A becomes the group 802B after failure of the first node 804, as indicated by the arrow 808. The first node 804 of the group 802A becomes the first node 804' of the group 802B to indicate failure. The second node 810 as joined the multicast group 802B. The first node 804' is indicated as in the group 802B, but may have left the group 802B already. The packets 806 are therefore now sent to the second node 810 in addition to the first node 804'.

Figure 9:
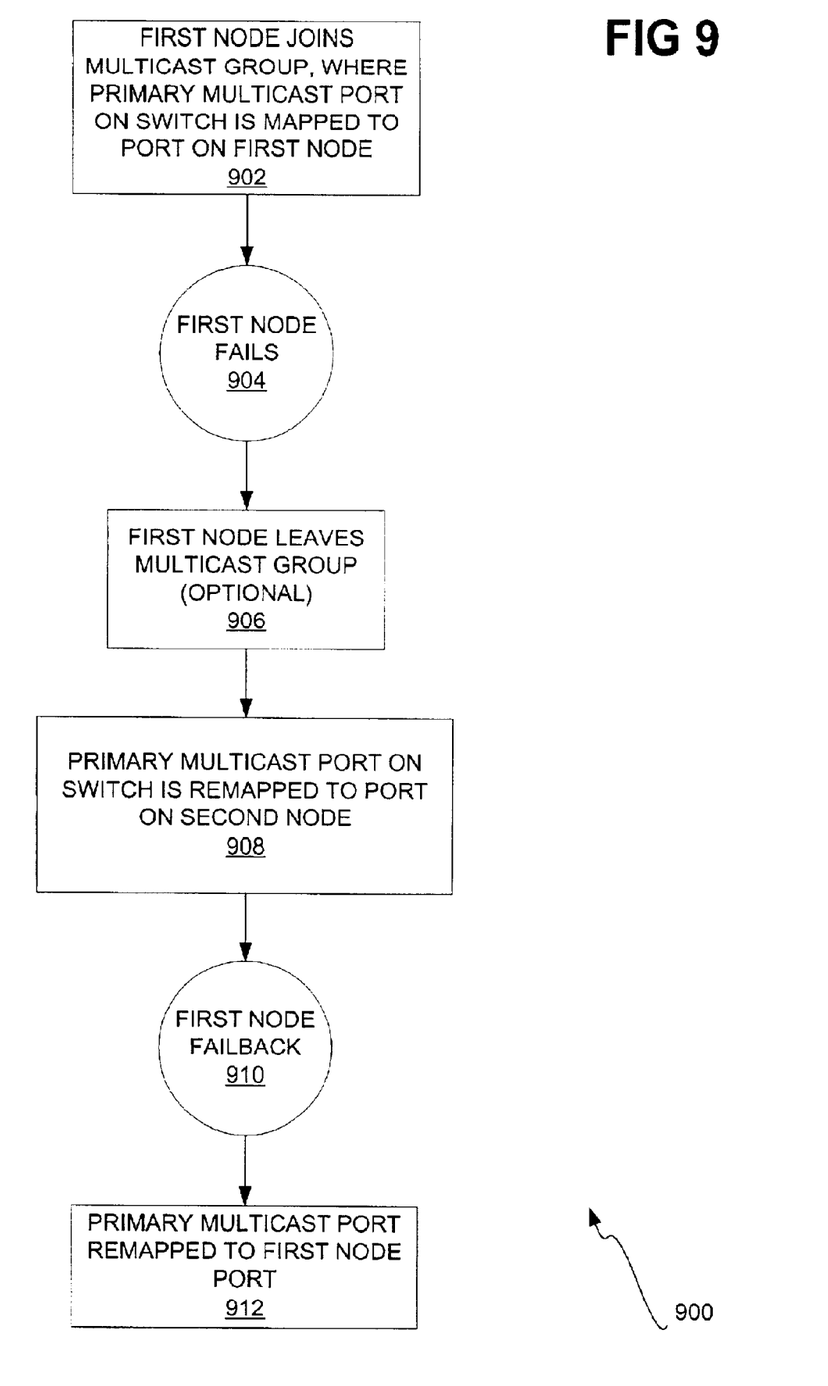
FIG. 9 is a flowchart of a method showing how an embodiment of the invention can achieve network node failover by remapping a switch multicast port to a port on another node.

Switch Multicast Port Remapping to Port on Second Node for First Node Failover Embodiments of the invention can also achieve network node failover by remapping a switch multicast port to a port on another node. FIG. 9 shows a method 900 according to such an embodiment of the invention. A first node of an Infiniband network joins a multicast group, where the primary multicast port on a switch is mapped to a port on the first node (902). The subnet manager (SM) of the subnet of which the first node and the switch are a part performs this mapping, in response to a join request by the first node. The first node may be a channel adapter (CA) of a host on the subnet of the network.

The first node then fails (904), which is typically detected by another node of the subnet. The first node may optionally leave the multicast group (906), by, for example, a second node of the subnet sending a leave request to the SM on behalf of the first node. The primary multicast port on the switch is then remapped to a port on the second node (708). More specifically, the SM remaps the primary multicast port on the switch to the port on the second node, in response to a corresponding, optionally proprietary, request by the second node. The second node may also be a CA of a host on the subnet of the Infiniband network. The host of the second node may be the same host as that of the first node. Communication to the multicast address is directed to the port on the second node, instead of the port on the first node, such that the first node seamlessly fails over to the second node.

At some point, the first node may failback (910), coming back online. The primary multicast port on the switch is then remapped back to the port on the first node (912), so that the first node can again handle communication intended for the multicast address, which may be a multicast destination location identifier (DLID). The second node of the subnet may have to initially leave the multicast group, and thus may send a leave request to the SM before the primary multicast port is remapped back to the port on the first node. Failback may also include the first node taking a state dump from the second node, where the second node freezes all connections until the failback has been completed. The second node may additionally not leave the multicast group until existing connections to the second node have expired.

Figure 10:
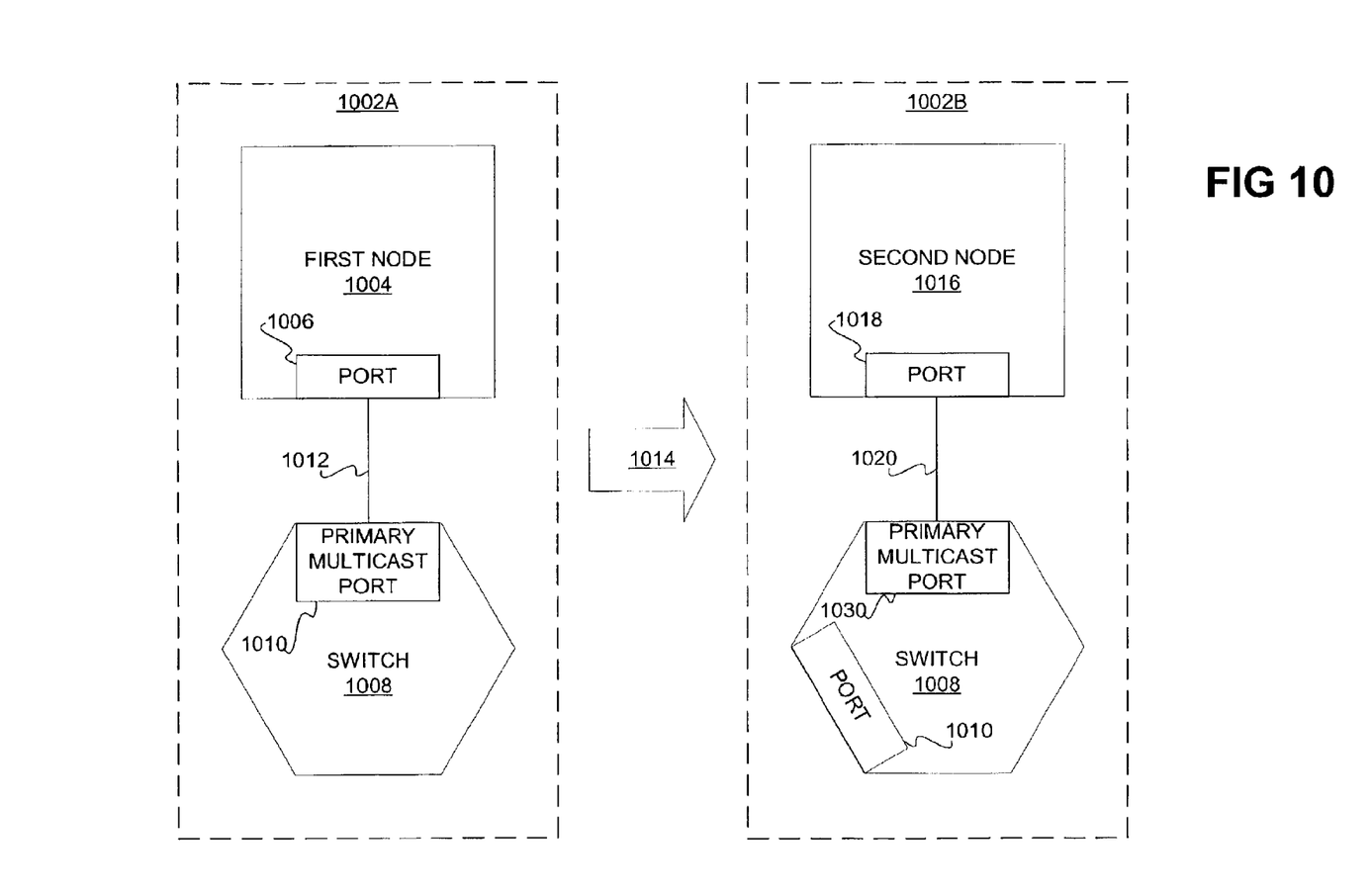
FIG. 10 is a diagram showing diagrammatically the performance of the embodiment of FIG. 9.

FIG. 10 shows the failover of the first node to the second node diagrammatically. A part of the subnet is denoted as the part 1002A to signify the pre-failure state of the first node 1004. The first node 1004 has a port 1006. A switch 1008 has a primary multicast port 1010. The primary multicast port 1010 of the switch 1008 is mapped to the port 1006 of the first node 1004, as indicated by the line 1012. Multicast communication directed to the switch 1008 is thus sent to the port 1006. The part of the subnet is denoted as the part 1002B to signify the post-failure state of the first node 1004, such that the part 1002A becomes the part 1002B after failure of the first node 1004, as indicated by the arrow 1014. A second node 1016 has a port 1018. The multicast port 1030 of the switch 1008 is now made the primary multicast port and mapped to the port 1018 of the second node 1016, as indicated by the line 1020. Multicast communication directed through the switch 1008 is thus now sent to the port 1018 instead.

Switches, and Datagram and Connected Service Types

Infiniband networks employ switches that typically check only that the destination location identifier (DLID) is not zero, and route data packets based on the tables programmed by the subnet manager (SM). Each switch is preferably configured with routing information for multicast traffic that specifies all of the ports where a multicast data packet needs to travel. This ensures that multicast packets are routed to their correct destination.

Furthermore, Infiniband networks can employ different types of datagrams and connected services. Datagrams are used where the order in which packets are received, as compared to the order in which they are sent, does not matter. Datagram packets may be received out-of-order as compared to the order in which they were sent. Datagrams may be raw, which generally means they are in accordance with a non-Infiniband specification, such as Ethertype, Internet Protocol (IP) version 6, and so on. Conversely, connected services are used where the order in which packets are received, as compared to the order in which they are sent, does matter. Connected service packets are received in the same in order in which they are sent.

Both datagrams and connected services may be reliable or unreliable. Reliability generally relates to whether sequence numbers are maintained for packets, whether acknowledgement messages are sent for packets received, and/or whether other verification measures are performed to ensure that packets sent are received by their intended recipients. Unreliable datagrams and unreliable connected services do not perform such verification measures, whereas reliable datagrams and unreliable connected services do perform such verification measures.

With respect to unreliable and raw datagrams, a server uses the multicast location identifier (LID) as its source LID (SLID). The client is able to receive such packets, because they are sent to its unicast DLID, and because the SLID of the packets is not checked. The client is expected to reply to the server's multicast LID. For this to occur, the client may be sent a multicast LID association, which is recorded by the client. If the client determines the LID from a path record maintained by the SM, then the appropriate value for the LID may be placed in the path record prior to replying. When the server receives the reply packet from the client, the packet has a non-multicast queue pair (QP) but a multicast DLID.

Both link-level and transport-level checks are also verified. The link-level check only verifies the LID, either multicast or unicast, of the client. In the transport-level check, the receiving QP is first verified as valid, because the sender set the QP. Furthermore, the receiving DLID is a multicast DLID that has been configured for the QP, and therefore is also verified as valid. Finally, the QP is verified as not 0xFFFFFFFF hexadecimal, and therefore the data packet is not considered to be a multicast packet, such that the presence of a multicast global route header (GRH) is not checked.

With respect to reliable datagrams and reliable and unreliable connected services, multicasting is not allowed, in that it is not defined. However, this restriction can be overcome if the two end nodes otherwise function in a unicast manner. The server sends packets to the clients using a multicast LID. The remote client may check whether the SLID is a multicast LID. If so, then the client's host channel adapter (HCA) may be modified to receive multicast SLIDs, or the SM can be modified to associate a unicast LID with the multicast group.

That is, the unmodified receiver concludes the SLID is multicast only if it is above 0xC000 hexadecimal. Therefore, the SM is modified so that it assigns a value below 0xC000 hexadecimal to the multicast group, such that the receiver does not conclude the SLID is multicast. The client replies to the server, which receives a packet specifying a DLID. The server may check whether the DLID is a multicast LID. If so, then the server's HCA may be modified to receive multicast DLIDs, or the SM can be modified to associate the unicast LID with the multicast group.

Advantages Over the Prior Art

Embodiments of the invention allow for advantages over the prior art. By taking advantage of the multicast addresses and ports of Infiniband networks, node failover is achieved. Even if a given Infiniband fabric does not allow multicasting, embodiments of the invention can still be used where the failed node leaves the multicast group before another node joins the group, so that there is only one node in the group at a time. Failover of a failed node does not require involvement of the remote node with which the failed node had been communicating. Rather, the takeover node assumes the responsibilities of the fail node transparently, and typically without knowledge of the remote node. Any host can preferably take over the responsibilities of a failed host. Embodiments of the invention are also applicable to all Infiniband transport types. Nonproprietary extensions to the Infiniband specification are generally unnecessary to implement embodiments of the invention, such that the embodiments work within the auspices of the specification.

Alternative Embodiments

It will be appreciated that, although specific embodiments of the invention have been described herein for purposes of illustration, various modifications may be made without departing from the spirit and scope of the invention. For example, where the invention has been largely described in relation to Infiniband networks, the invention is applicable to other types of networks as well. Accordingly, the scope of protection of this invention is limited only by the following claims and their equivalents.

I claim:

1. A method comprising:

joining by a first node of a network to a multicast group having a multicast address, the multicast address specified by a server using a multicast location identifier (LID) as its source lid (SLID), the first node receiving packets from the server due to the packets being sent to a unicast destination location identifier (DLID) of the first node, the server receiving reply packets from the first node having a non-multicast queue pair (OP), but a multicast DLID, where the joining is selected from the group essentially consisting of:

assigning the multicast address to the first node, such
that communication to the multicast address is
directed to the first node through the network, and,
mapping a multicast port on a switch of the network to
a port on the first node, such that communication to
the multicast address is directed to the port on the
first node from the multicast port on the switch; and,
upon failure of the first node,
if the joining assigned the multicast address to the first
node, joining by a second node of the network to the
multicast group, such that the multicast address is
assigned to the second node, and the communication
to the multicast address is handled by the second
node, and,
if the joining mapped the multicast port on the switch
to the port on the first node, remapping the multicast
port on the switch to a port on the second node, such
that the communication to the multicast address is
directed to the port on the second node.

2. The method of claim 1, further comprising, if the joining assigned the multicast address to the first node, prior to the second node of the network joining the multicast group, the first node leaving the multicast group by the second node sending a leave request to a subnet manager (SM) on behalf of the first node.

3. The method of claim 1, further comprising, if the joining assigned the multicast address to the first node, upon failback by the first node, assigning the multicast address to the first node, such that communication to the multicast address is again handled by the first node.

4. The method of claim 1, wherein, if the joining mapped the multicast port on the switch to the port on the first node, the multicast port on the switch is remapped to the port on the second node by the second node requesting to remap the multicast port on the switch to the second node to a subnet manager (SM), the SM remapping the multicast port on the switch to the port on the second node.

5. The method of claim 1, further comprising, if the joining mapped the multicast port on the switch to the port on the first node, upon failback by the first node, remapping the multicast port on the switch to the port on the first node, such that communication to the multicast address is again directed to the port on the first node.

6. The method of claim 1, wherein the joining by the first node of the network to the multicast group comprises the first node requesting to join the multicast group to a subnet manager (SM), the SM assigning the multicast address to the first node and mapping the multicast port on the switch to the port on the first node.

7. The method of claim 1, wherein after the joining by the first node to the multicast group, the multicast group has only a single member, the first node.

8. The method of claim 1, further comprising, upon failure of the first node, the second node initially detecting the failure of the first node.

9. A system comprising:
a server;
a first node of a subnet having a port and initially having assigned thereto in a first mode a multicast address of a multicast group, such that initially communication to the multicast address is handled by the first node, the multicast address specified by a server using a multicast location identifier (LID) as its source lid (SLID), the first node receiving packets from the server due to the packets being sent to a unicast destination location identifier (DLID) of the first node, the server receiving reply packets from the first node having a non-multicast queue pair (QP), but a multicast DLID;
a second node of the subnet having a port;
a switch of the subnet having a multicast port initially mapped in a second mode to the port on the first node; and,
a management component of the subnet where, upon failure of the first node, the management component assigns the multicast address to the second node in the first mode, and remaps the multicast port on the switch to the port on the second node in the second mode, such that communication to the multicast address is handled by the second node.

10. The system of claim 9, wherein the second node detects the failure of the first node.

11. The system of claim 9, wherein the management component detects the failure of the first node.

12. The system of claim 9, wherein upon failback by the first node, the management component assigns the multicast address to the first node in the first mode, and remaps the multicast port on the switch to the port on the first node in the second mode.

13. The system of claim 9, wherein each of the first node and the second node comprises at least one of: a host and a channel adapter (CA).

14. The system of claim 9, wherein each of the first node and the second node comprises a channel adapter (CA) on a same host.

15. The system of claim 9, wherein the network comprises a subnet having a subnet manager (SM), where the management component is the SM.

16. An article comprising:
a computer-readable medium; and,
a computer program stored in the medium and executable by a computer for performing one of two actions selected from the group essentially consisting of: assigning a multicast address of a multicast group that was initially assigned to a first node of a network that has failed to a second node of the network; and, remapping a multicast port on a switch of the network that was initially mapped to a port on the first node that has failed to a port on the second node,
wherein the multicast address is specified by a server using a multicast location identifier (LID) as its source lid (SLID), the first node receiving packets from the server due to the packets being sent to a unicast destination location identifier (DLID) of the first node, and the server receiving reply packets from the first node having a non-multicast queue pair (QP), but a multicast DLID.

17. The article of claim 16, wherein the computer program assigns the multicast address of the multicast group that was initially assigned to the first node of the network that has failed to the second node of the network in response to receiving a request from the second node to join the multicast group.

18. The article of claim 16, wherein the computer program remaps the multicast port on the switch on the network that was initially mapped to the port on the first node to the port on the second node in response to receiving a remapping request from the second node.

19. The article of claim 16, wherein the medium is a recordable data storage medium.

* * * * *